Sept. 27, 1960 L. K. ANDERSON ET AL 2,954,298
METHOD OF PREPARING FISH FOR CONSUMPTION
Filed Oct. 7, 1958 2 Sheets-Sheet 1
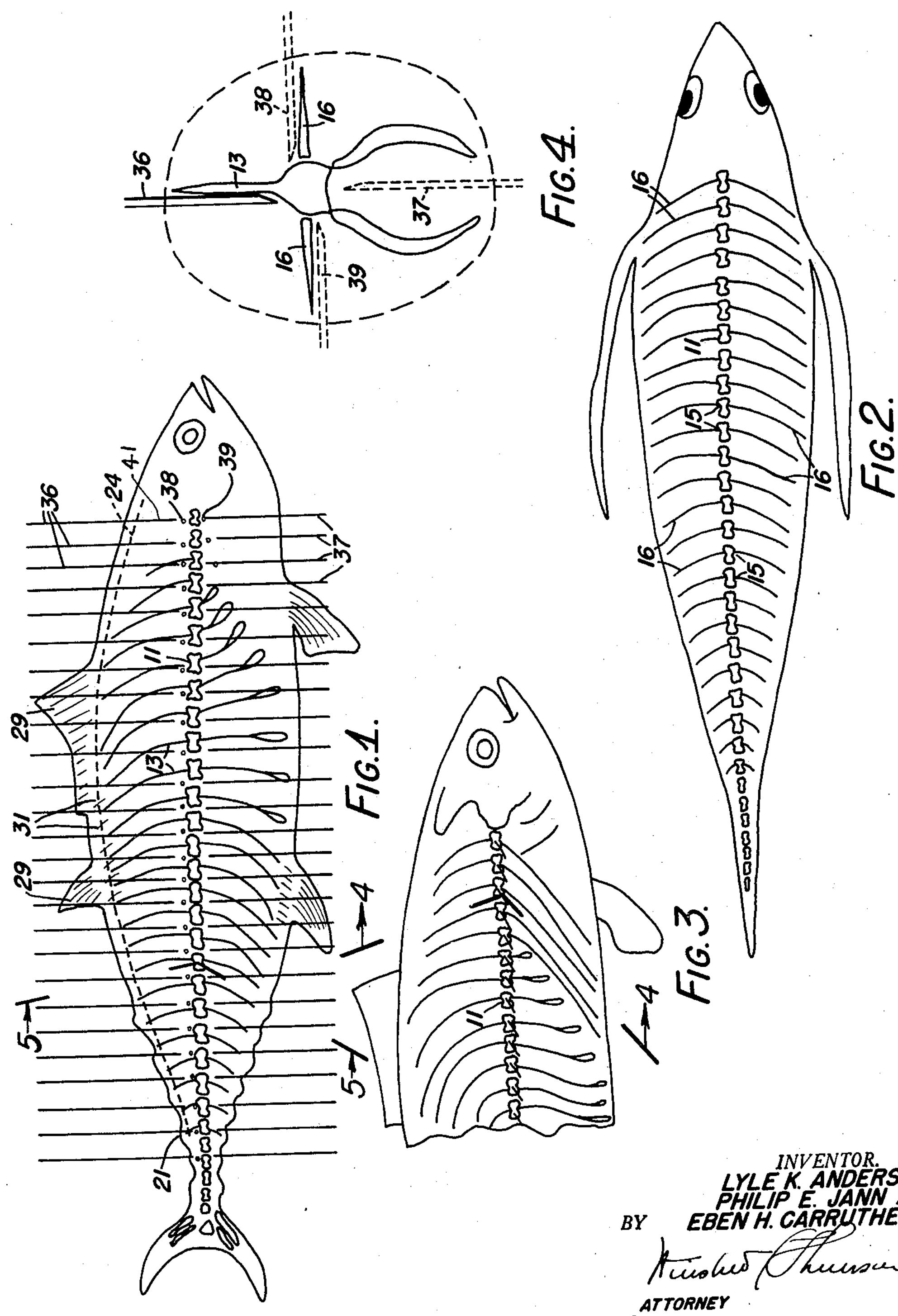
INVENTOR.
LYLE K. ANDERSON
PHILIP E. JANN AND
EBEN H. CARRUTHERS
BY
ATTORNEY

METHOD OF PREPARING FISH FOR CONSUMPTION

INVENTOR.
LYLE K. ANDERSON
PHILIP E. JANN AND
EBEN H. CARRUTHERS
BY
ATTORNEY

United States Patent Office 2,954,298 Patented Sept. 27, 1960

1

2,954,298

METHOD OF PREPARING FISH FOR CONSUMPTION

Lyle K. Anderson, Warrenton, Oreg., Philip E. Jann, Bremerton, Wash., and Eben H. Carruthers, Warrenton, Oreg., assignors to Fish Processes Corporation, Warrenton, Oreg., a corporation of Oregon Filed Oct. 7, 1958, Ser. No. 766,177

17 Claims. (Cl. 99—111)

This invention relates to a commercial method of preparing fish for human consumption and is a continuation-in-part of application Serial No. 461,468, filed October 11, 1954, now abandoned.

The method of our invention may have general application in the preparation of fish for market in a frozen, fresh or canned condition. The method primarily relates to the cleaning of fish preliminary to the marketing of the fish in the commercial forms existent. For example, large quantities of fish are prepared for market by filleting, the fillets usually being sold either fresh or frozen. Filleting is extremely wasteful of fish since a large amount of desirable flesh remains on the skeletal structure and cannot be economically removed for human consumption.

By the method of our invention it may be possible to produce fish fillets in a manner less wasteful of fish. In the recent past so-called fish sticks, a breaded and frozen fish product, have become increasingly popular. These so-called fish sticks, although they may be sold raw frozen, are usually precooked so that they may be conveniently served by the housewife in a minimum of time by merely heating. The fish segments or sections going into the production of fish sticks may be produced by the methods of our invention. In the salmon industry although some salmon are mechanically skinned, the largest percentage of the total pack is put up in cans together with the bones and skin. Removal of the bones and skin is too expensive and time-consuming except primarily for fancy pack which commands a price premium on the market. The salmon industry has long sought an economical method of removing the skin and bones. This is possible by the method of our invention.

While these and other possibilities for the application of the invention exist, the invention is primarily concerned with the preparation of tuna and tuna-like fishes for market. The invention will therefore be described in connection with the preparation of tuna. However, it will be understood that the method has broader application as outlined above.

For the purposes of comparison and more distinctly pointing out this invention, the process presently employed for the preparation of tuna and related species for canning consists essentially of the following steps with only minor variations in the techniques employed by the various canners.

If the tuna reaches the cannery in a frozen condition it is first thawed after which the fish is placed on a butchering table and the belly of the fish slit open. The visceral organs are then removed and the body cavity thoroughly washed out. In some procedures the head is then removed but more usually the head is removed at a later step in the process.

The partly cleaned fish are then placed in wire baskets or other holders and subjected in a suitable low pressure retort or steam chamber to the cooking action of steam at from 212° to 220° F. until the flesh has been what is termed in the art "precooked." The entire fish must be cooked to such a degree that the tissues holding the

2 fleshy segments or tuna loins to the bony and cartilaginous material which may be generally termed the skeletal structure, are so weakened, loosened or broken down that the loins or fleshy segments may be readily torn away and separated from the skeletal structure. It is at the precooking step that one of the major differences between our method and present commercial practices occurs.

The precooking step in present commercial practice involves precooking the gilled and eviscerated fish which we will term for convenience of expression "cooking in the round." The expression "in the round" as used in the fish industry means a fish untouched by a knife but as used herein will include a fish upon which some operations have been performed but one in which the four loins are still attached to the major part of the skeletal structure. That is, the dressed but whole fish is cooked and since the cooking must extend to the spinal formation adjacent the longitudinal center of the fish to enable subsequent cleaning the duration of the cook is relatively lengthy. The cooking time may vary from 1½ hours for very small fish such as skipjack to from 8 to 10 hours for large yellowfin or blue fin which may weigh up to 300 pounds.

It is generally thought by workers in the tuna industry that the primary purpose of precooking tuna is to remove the natural oils which are supposedly bitter and lend to the canned product an excessively fishy taste. The natural oils are later replaced in accordance with usual practices with vegetable oils supposedly to render the fish more satisfactory to the taste than would otherwise be the case if the natural oils of the fish were retained. However, some technical opinion which has at least been partially verified considers that the removal of the natural oils occurring in the precooking is insufficient percentagewise to materially influence the taste of the resulting product. Whether this is true or not is immaterial, since the fish must be precooked for a lengthy period of time for the purpose of breaking down or loosening the tissues which hold the flesh of the fish to the skeletal structure.

Various efforts have been made to eliminate precooking or to avoid cooking in the round because of inherent disadvantages. One such effort is represented by Borg Patent No. 2,411,188, another by Stevenson et al. Patent No. 2,635,050, and a third by Berglund Patent Nos. 2,534,219 and 2,612,652. These processes, insofar as we are aware, have not been commercially accepted.

Briefly, the excessive and uneven cooking necessitated by cooking in the round has the following distinct and very serious disadvantages: the excessive cooking time and subsequent cooling time required before the fish can be further processed; the excessive time during which the fish are exposed to the air and consequent enzyme action; the losses resulting from shrinkage due to the loss of natural oils, juices and moisture; the lack of uniform cooking, the exterior portions of the fish being usually overcooked while the interior portions thereof are undercooked; the undercooking of large fish and the overcooking of small fish cooked in the same batch; "running of the color" of the dark undesirable portions of the fish into the light edible portions of the fish during cooking and subsequent cooling; and the excessive cost resulting from increased labor, fuel and cooking facilities.

Tuna is an expensive fish and the losses resulting from present procedures are substantial. According to some practical men in the field and the Special Scientific Report, Fisheries No. 104 of the United States Fisheries and Wildlife Service, during precooking and cooling, shrinkage takes place amounting up to 30 percent of the weight of the tuna, two-thirds to three-fourths of the loss occurring during cooking and the balance during cooling of the fish. This is caused by loss of oil, solids and moisture during cooking and loss of moisture due to evaporation and drip during cooling of the fish. Since the cost of the fish in the neighborhood of about four hundred dollars ($400.00) per ton represents approximately seventy (70%) percent of the processor's cost, any saving in the shrinkage occurring during precooking and cooling is of the greatest importance.

The next step in the presently employed process of preparing tuna for canning is the cooling of the precooked fish. It will be appreciated that a warm fish is relatively fragile and friable. The fish cannot be handled without breaking apart and flaking during subsequent cleaning. Tuna flakes sell at a substantial discount. The flesh must be firm before subsequent steps of the process can be carried out. In some canneries the precooked tuna is cooled under a refrigerated atmosphere. In most plants the tuna is air cooled. By either method the cooling period is lengthy, air cooling requiring 12 to 16 hours and a cooling time of 24 hours is not unusual. Losses during cooling of the precooked fish may amount to as much as 10 percent of the total weight according to the technical report previously mentioned.

After the fish has been thoroughly cooled the head is removed unless this has been done earlier. The skin and fins are scraped off and undesirable meat closely underlying the skin removed during the scraping. This step is usually accomplished by scraping the fish with a knife. The fish is then split longitudinally and the backbone or spinal formation removed. The fish is then separated into quarters or loins and these fleshy segments are further freed of small detached and adhering or imbedded bones and cartilage. The loins or segments are further scraped for the purpose of removing dark meat, discolored flesh and any other undesirable tissues. The desirable remaining loins are then ready to be chopped, cut or formed for placement in cans or other containers. Usually salt and a vegetable oil are added after which the container is sealed and the filled can retorted.

It will be appreciated that the above described present process is time-consuming, expensive and wasteful. Yet it has withstood the efforts of a great many researchers in the field to improve the process. Notwithstanding, with relatively minor changes it has been the standard procedure substantially since the inception of tuna canning in this country. The only major change which has occurred in the procedures of the industry has been the introduction of mechanical packing machines for automatically cutting the loins and placing the proper weight of tuna into the cans by machine. Insofar as commercial practices are concerned, no material change has been made in the procedures for cleaning and preparing the tuna up to the placing of the tuna in the cans.

An object of our invention is to provide an improved process for preparing fish for market to effect a saving in labor, a saving in time, minimize wastage of raw material, and effect savings in costs.

Another object of our invention is to provide a method particularly adapted to the canning of tuna whereby the cleaning operations may be so carried out and the time element so reduced as to possibly enable the entire operation including the packing of the tuna into cans to be placed on a straight line substantially continuously moving production basis.

Another object of our invention involves a step in the process of preparing tuna for market which may be termed "selective cooking" which enables the separation of the usable loins of the fish from the skeletal structure with a minimum of hazard from the possibility of bone fragments adhering to or being imbedded in the separated loins.

Another object of our invention is to provide a method of precooking relatively small tuna loins, divided tuna loins or fish segments as distinguished from cooking the tuna in the round whereby accurate control of the cooking time and temperature can be obtained, reduced cooking time is effected, overcooking and undercooking materially reduced, the natural juices and nutritive ingredients of the fish retained in larger degree and the flavor of the finished product favorably controlled.

A further object of our invention is to effect a very material reduction in the cooking time required which results from the present practices of cooking the fish in the round to thereby accomplish a reduction in the cost of fuel and labor, a reduction in the wastage of edible product and the processing of more fish with the same amount of or less equipment and cannery space.

Still another object of our invention is to provide an improved process of removal of tuna loins from the skeletal structure which enables more efficient skinning of the loins to thus effect a reduction in the labor required for the skinning operation and simultaneously effect a saving in the present wastage of edible product due to the inefficiency of the present methods of performing the skinning operation.

A still further object of our invention is to enable a reduction of the total time now required of from 16 to 24 hours to cool precooked tuna to possibly as little as 15 minutes to 2 hours in the case of a 10 to 15 pound fish to the end that less preparation is required in anticipation of a day's pack, and less cannery space is required to effect the same.

Still another object of our invention is to provide a method of deboning tuna by a process which may be termed "selective cooking" or "selective denaturing" of the fish when it is in a raw state so only those portions of the fish directly adjacent the skeletal structure are heated to any substantial degree or denatured to the end that essentially raw loins may be produced whereby improved skinning procedures may be applied and the precooking of the tuna may be controlled in a manner such that a superior product may be produced with a minimum of waste and at a minimum of cost.

Our invention further contemplates a method of processing particularly tuna fish in which access to the dark, undesirable portions of the fish may be had prior to any substantial cooking of the fish to thereby prevent or minimize "running of the color" or the discoloration of the white or light meat of the tuna by adjacent dark portions which occurs during present processes of cooking the tuna in the round.

Other objects and advantages of our invention will be particularly set forth in the claims and will be apparent from the following description, when taken in connection with the accompanying drawings in which:

Fig. 1 is a diagrammatic partly phantom view, being a side elevation of a tuna, the view and subsequent views showing approximately a composite of the main parts of the skeletal structure of a skipjack and an albacore tuna, the view showing the banks of horizontally and vertically projecting steam needles by which part of the process of our invention is carried out;

Fig. 2 is a top plan partly phantom view of Fig. 1 and showing the central backbone or spinal formation and the epi-central ribs;

Fig. 3 is a more detailed view of a portion of Fig. 1 showing the general skeletal structure of the anterior section of the fish and in particular showing the pleural ribs;

Fig. 4 is a sectional view taken substantially on the line 4—4 of Fig. 3 and showing the steam needles in dotted lines;

In the tuna industry the four pieces of fish which are separated from each other longitudinally of the fish by ribs or spines and the membranes between these ribs and spines are usually termed "loins." We are not aware of whether this term is common in the fish industry and means the same thing in other segments of the fish industry. Therefore, for the most part in this specification and the appended claims we will employ the word "loin" as applying to any fish and as applying to a section of a fish which is separated from other sections by rows or lines of bones and/or membranes extending between the bones to define approximate planes of cleavage or partitions.

The term "denaturing" by dictionary definition is broad. In the absence of a more apt term, as used in this application it will be employed to define the alteration of a protein from its native state wherein it becomes at least partially coagulated among other phenomena and will apply particularly to the weakening or degradation of the strength of the proteinaceous tissues, especially those tissues joining muscle parts to the skeletal structure or to the common integument. "Denaturing" can be accomplished by heat applied preferably in the form of steam. While steam has been found to be satisfactory as the heating or cooking medium, it is possible that other well known forms of applying heat would be practicable such as hot inert fluids, electrical resistance heating, electrical capacitance heating or other heating means.

For the purpose of more clearly presenting our invention, it is desirable that the most important elements of the skeletal structure of a tuna fish be clearly in mind. The drawings are largely diagrammatic and it is not intended that they shall show in exact detail the entire skeletal structure of a tuna fish. In fact as previously mentioned, actually the drawings are an approximate composite of the skeletal structure of an albacore and a skipjack. In employing the terms to describe our process we have for the most part used terms which we believe to be accurate. Notwithstanding the fact that there appears to be some differences of opinion among those skilled in the art as to proper terminology, no confusion will result in case of minor error as it is believed that what is meant will be clear to those skilled in the art from the specification aided by the drawings.

Figure 6:
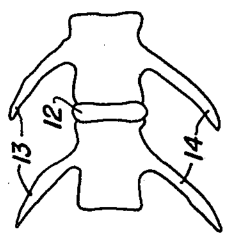
Fig. 6 is an enlarged view of a portion of the spinal column to clearly show the intervertegral pod.

In general, the skeletal structure of a tuna fish comprises a backbone or spinal formation indicated by the numeral 11 which is approximately centered with respect to the fish and extends from the head into the tail. The bones of the spinal formation are connected by what we believe is known as the intervertebral pod 12 (see Fig. 6). The intervertebral pod is of somewhat cartilaginous nature and allows the spinal formation to bend or flex. Extending vertically upward and integral with the bones of the spinal formation are what are known as neutral spines 13 and extending vertically downward and integrally secured to the bones of the spinal formation are what are known as haemal spines 14. The neutral and haemal spines are shown in Fig. 6. The spines and the bones of the spinal formation are sometimes termed the backbone. For the purposes of the claims, the expression "spinal formation" will be employed to designate the longitudinally extending bones 11, and the spines, although considered to be part of the backbone, when specifically included will be separately set forth in the claims.

Referring to Fig. 2, attached to the bones of the spinal formation by ligaments at 15 and extending outwardly on each side of the spinal formation are what are known as epi-central ribs 16. These epi-central ribs, unlike the neural and haemal spines, are not integral with the bones of the spinal formation. They are more readily loosened with respect to the spinal formation than are the spines, when heat or other tissue or ligament-weakening media are applied to them. Between adjacent spines and adjacent ribs and extending longitudinally of the fish and outwardly from the spinal formation is a tough membrane 17 (Fig. 8) which in accordance with our information is known as the myoseptum. The membrane between neural spines is called the dorsal skeletogenous septum and the membrane between the haemal spines is called the ventral skeletogenous septum. The myosepta between the epi-central ribs while less pronounced than the myosepta between the spines, at least in tuna, are sufficiently tough and strong for the purposes of our invention as will presently appear. In the claims, when included, these myosepta 17 will be called "membranes." Myosepta appear to be absent between the epi-central ribs of salmon species we have examined but may be present in other fish species.

From the foregoing, it will be understood that the tuna is divided into four sections distinctly separated from each other by continuous walls which define natural planes of cleavage. These natural planes of a cleavage are made up of the bones which extend essentially radially with respect to the spinal formation and the membranes extending between the bones. These partitions divide the meaty or muscle portions of the fish into two dorsal loins 18 sometimes termed the right and left epaxial muscles and two ventral loins 19 sometimes termed the right and left hypaxial muscles. These fleshy or muscle portions of the fish, as previously mentioned, are called in the tuna industry "loins."

Perhaps the most important aspect of the method of our invention lies in the realization that these rows of bones and the myosepta between them form natural planes of cleavage. While these planes of separation have been probably understood by those versed in the art, no one insofar as we are aware, has fully taken advantage of them. In accordance with our invention we take advantage of or utilize these natural planes of separation: to accomplish the separation of the fish into four loins in a minimum of time; the cleaning of the fish in an expeditious manner; the facilitation of the removal of the skin; and the application of better methods of precooking and cooling the fish preparatory to canning. While we have not studied the matter in detail, we believe that most fish have natural planes of cleavage which allow the fish to be separated into four loins or quarters. Not all fish, however, have epi-central ribs lying in the horizontal cleavage planes, as for example, the hearing and the salmon.

After the fish have been thoroughly thawed, assuming they have previously been frozen as is usually the case with respect to tuna, the first step in the method of our invention is to eviscerate the fish which is preferably done in the usual manner by slitting open the belly longitudinally of the fish. The visceral organs are then removed and the body cavity washed out. The reason why thorough thawing is desirable is that the parts of the fish adjacent the spinal formation are the last to thaw. In our method, when heat is applied along the planes of cleavage or separation previously mentioned, it is more difficult to secure the desired results if sufficient heat must be applied not only to raise the temperature of the fish to a "denaturing temperature" but also to overcome the latent heat of fusion of any ice present.

Figure 10:
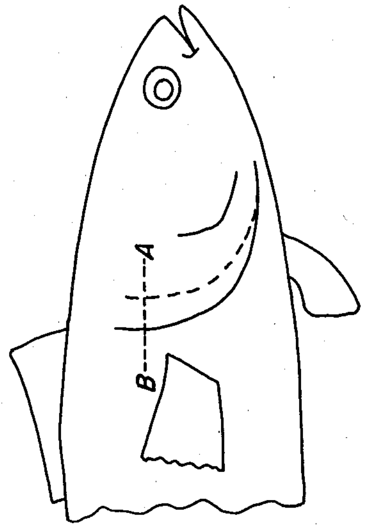
Fig. 10 is a side view of the head of the fish showing the collar or branchial arch of the fish.

The next step in the preferred method of our invention is to sever and remove the head which may be done in the usual manner, although the head may be removed later in the process. Two cuts are then made through the collar found adjacent the gills, one cut on each side of the body on the line A—B shown in Fig. 10. This collar, usually called the branchial arch, is a tough ring of cartilage which forms the anterior boundry of the lateral muscles or loins. Since the horizontal or lateral cleavage plane does not pass through the branchial arch, the branchial arch should be cut as indicated. The tail is then removed by severance in the region of the caudal peduncle located adjacent the numeral 21 (Fig. 1). The reason for removal of the tail is that it has strong tendons which if not removed make parting of the loins very difficult.

Figure 5:
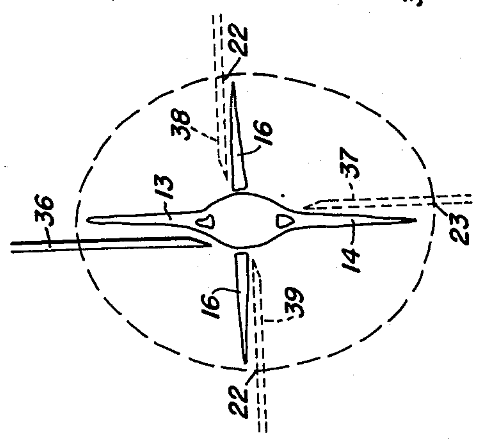
Fig. 5 is a sectional view taken substantially on the line 5—5 of Fig. 1 and showing the steam needles in dotted lines.

The next step in the method is to slit the skin by means of a knife longitudinally of the fish on both sides thereof substantially in the plane of the epi-central ribs along the lines indicated by the numeral 22 in Fig. 5. The skin is also preferably slit along a line longitudinally of the fish approximating extensions of the belly slit previously made, that is, substantially in the haemal plane along the line indicated by the numeral 23 in Fig. 5. The slitting of the skin is not absolutely essential to the carrying out of the invention for as will be obvious as this specification proceeds, by employing sharp needles and exercising a considerable force the needles may be forced through the skin. However, this slitting of the relatively tough skin facilitates entry of the needles and minimizes the possibility of needle breakage and further, it aids in separating the loins as will be apparent later in this explanation.

Figure 7:
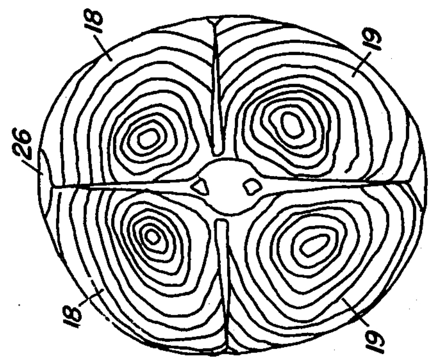
Fig. 7 is a sectional view approximately taken on the same line as Fig. 5 showing the muscle segments or loins of the fish and the cleavage planes.
Figure 8:
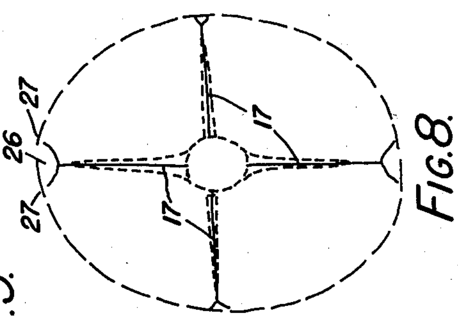
Fig. 8 is a typical cross-section in the posterior portion of the fish taken approximately on the same line as Fig. 5 showing the approximate myosepta pattern or membrane-like tissue between the bones and defining the natural cleavage planes which aid in separating the loins.

We have found that across the back of the fish as indicated by the dotted lines 24 in Fig. 1, a relatively tough strip of cartilage and fine bones exists. This strip is indicated at 26 in Figs. 7 and 8. It is difficult but not impossible to cause needle penetration of this strip 26 due to the tough cartilage and fine bones which it contains. By slitting the skin alone longitudinally of the fish the full length thereof on the lines indicated by the numeral 27 in Fig. 8, the entire strip 26 may be torn out longitudinally of the fish by grasping the loose end formed by the cut at 21. As indicated in Figs. 7 and 8, this strip is roughly V-shaped in cross-section and carries the first and second dorsal fins, indicated by the numeral 29, and the interneural bones indicated by the numeral 31. After the longitudinal incisions 27 and the cut 21 have been made the stripping is easily accomplished and not only are the dorsal fins removed but also substantially all the interneural bones are carried away with strip. A similar strip occurs on the periphery of the fish at the junction of the two ventral loins and may be similarly removed if desired.

We are unaware whether or not this strip of bone-carrying cartilage is common to all fish but the best information obtainable indicates that a formation somewhat simulating that described exists in most commercial fish species. In tuna it is quite pronounced and upon removal resembles a thick somewhat triangular rope. We are informed that this strip is known as the supracarinales muscle but applicants for the purposes of this specification will term it the "key" because it appears to assist in holding the two dorsal loins together. Removal of this strip is also not entirely necessary but its removal greatly facilitates needle penetration.

Figure 9:
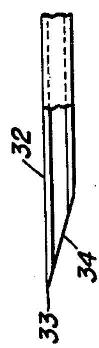
Fig. 9 is a sectional view of one type of steam needle which may be employed in carrying out one of the steps of our method.

The tuna is now in condition to have applied thereto means for denaturing the proteins along the planes of cleavage or separations previously described. Denaturing is preferably accomplished by heat in the form of steam. The preferred method of applying the steam to the fish is by means of hollow tubular members or needles 32 shown in Fig. 9. These tubular needles have a sharpened end 33 to facilitate piercing of the flesh and a discharge opening 34. The discharge opening is preferably at the forward end of the tubular member 32. However, the forward end may be closed and in lieu thereof side openings in the tube may be provided. We have found a conventional 3½" No. 13 stainless steel needle to be satisfactory for the purposes desired. However, it is understood that other sizes of tubular members may be employed. Experiments have also been conducted employing heated knives, wires or needles inserted into the fish at said planes of separation essentially to the spinal formation for lengths of time end at temperatures to secure separation by denaturing the proteins or degrading or weakening of the connective tissues with respect to the skeletal structure as defined above. Such knives, wires or needles, while they can be employed, cause difficulty due to the fouling of the surface of these instruments.

Methods of denaturing the proteins by means other than heating the flesh have been tried but have not been pursued actively primarily due to the generally satisfactory results produced by injecting steam by means of hypodermic needles adjacent the planes defined above.

In addition to employing heat, "denaturing" in the sense of this word defined above, by means other than those mentioned have been attempted. For example, we have injected into the plane of the haemal spines of a two pound petrole sole, using a thirty milliliter syringe fitted with a number eleven hypodermic needle, one milliliter of five normal sodium hydroxide solution (20% lye water). These injections were made at one centimeter intervals over a ten centimeter section of dorsal fin line. It was observed that the edible muscle acquired a translucent appearance, bordering on transparency, over a period of several minutes. After a period of an hour, it was found that the two great lateral muscles could be separated in the plane of the haemal spines with somewhat less difficulty than was possible in the case of an untreated portion of the same fish. The flesh appeared denatured but not coagulated.

In a further experiment with chemical media, a ten (10%) percent solution of papain enzyme was injected in a similar manner into a similar flounder under similar conditions. In this case the flesh appeared to be denatured and coagulated where it was in contact with the solution and it appeared that it was possible to separate the two lateral muscles more easily than in the case of an untreated fish, although the difference in ease of separation was not great. In other words, denaturization was not accompanied by as much weakening of the tissues at and adjacent to the skeletal structure as occurred with the use of steam. Further, in the case of the liquid denaturants, there appeared to be a decided tendency for the liquid to exude its denaturing effect in a less favorable location exterior of the skeletal structure. Steam, on the other hand, seemed to denature the flesh ahead of the path of the needle and so produce a minimum of sidewise salients.

Because the above experiments indicated that heat, and in particular steam, was more desirable than chemical denaturing media chemical media were not further pursued.

A single needle may be employed inserted in the fish at successive points along the lines previously cut in the skin or more accurately along or adjacent the natural cleavage planes which separate most fish into four quarters longitudinally as previously described. A bank of needles has also been employed and in the commercial application of our invention it is probable that the fish would be supported vertically and four banks of needles simultaneously inserted into the fish, each bank encompassing a large part of the longitudinal extent of the fish. These needles would be projected downwardly into the fish in a plane adjacent the plane defined by the neural spines; upwardly in a plane adjacent the plane defined by the haemal spines and sidewardly into the fish from both sides in planes adjacent the planes defined by the epi-central ribs. In Fig. 1 the vertically projected banks of needles have been indicated by lines 36 and 37, the same banks of needles being indicated in Figs. 4 and 5 by the same numerals and the horizontally projected banks of needles by the rows of dots 38 and 39 (Fig. 1), these rows being also indicated in Figs. 4 and 5 by the same numerals.

Experiments have also been conducted to determine the most desirable steam temperature. Employing dry steam at about 20 pounds pressure and 260° F. which gave a temperature nominally somewhat greater than 212° F. as the steam emerged from the hypodermic needles gave very satisfactory results. The layers of flesh adjacent the cleavage planes previously described were denatured to an extent sufficient that the four loins of the fish could be readily separated or parted intact as whole loins from the skeletal structure. Although dry steam is preferred, wet steam or somewhat superheated steam also can be used. These experiments have further shown that the heating time required with steam at this temperature is of short duration. For example, using a 4-pound skipjack, the needle may be inserted at a rate such as to reach the region of the spinal formation in one second, allowed to pause for one second more or less, and withdrawn at a rate such that the needle is removed from the fish at the end of one second.

The above results were secured on relatively small fish such as skipjack and with little modification of procedure on relatively small albacore weighing about 10 pounds. It will of course be understood that variations in time and temperature may be desirable if large fish are encountered such as yellow-fin or bluefin which may weigh up to 300 pounds.

A description of one group of experiments may be helpful in an understanding of the invention. Steam at a pressure of 15 pounds per square inch was bled through a 3½" No. 13 hypodermic needle. While steam was issuing from the end of the needle it was plunged substantially into the plane of the neural spines of a thawed eviscerated 4-pound skipjack tuna at a speed such that about a second was required to traverse the depth from the surface substantially to the spinal formation of the fish. When the needle reached the spinal formation or the region thereabouts, movement of the needle was interrupted for a period of about one second, more or less; then the needle was withdrawn at a rate such that another second was required for withdrawal. At a distance removed from the site of the first injection by ½ to 1 inch but still substantially in the plane of the neural spines another injection was made in the same manner; then another further on, etc. until a row of injections were made at ½ to 1 inch intervals substantially in the plane of the neural spines. Then a similar row of injections was made substantially in the plane of the haemal spines from substantially the caudal peduncle to substantially the branchial arch and a row substantially in each of the two lateral epi-central rib planes, each insertion being made in the manner described above except that in the case of the lateral plane insertions, the insertions were not quite as deep and the duration of time was somewhat less, particularly the pause adjacent the spinal formation, to avoid entirely if possible or at least minimize, denaturing the ligaments that attach the epi-central ribs to the spinal formation.

After the procedure above was followed, the fish was broken apart into four long loins in a substantially raw condition with the majority of the epi-central ribs still attached to the spinal formation and the neural and haemal spines unaffected. The skeletal structure of the fish including the membranes between the spines and the membranes between the ribs was substantially intact with little or no flesh remaining on the skeletal structure.

The above described operation was carried out without removing the key as previously described. With the skin cuts made and the key removed, dry steam at 20 pounds per square inch pressure was introduced through a No. 17 hypodermic needle at ½ inch intervals in the same manner described above, into a thawed, de-finned and eviscerated skipjack. The needle entered the flesh more readily than in the experiment described above, particularly in the region of the dorsal fins and the region of the lateral lines posterior to and adjacent the operculum which is located approximately at the numeral 41 in Fig. 1. The pause at the depth of insertion was increased to 1½ to 2 seconds. Upon completion of the insertions, the fish cleaved readily by hand into the four loins previously described and the majority of the epi-central rib bones were not broken off the skeletal structure.

In both of the above experiments the flesh of the loins adjacent the points of needle insertion was not to any great extent cooked; the skeletal structure of the fish was substantially free of useful flesh; the loins were substantially fully intact and firm; the few epi-central ribs not remaining with the skeletal structure were adjacent the surface of the loins and could be readily picked out; and of course except for the parts of the loins adjacent the planes of cleavage the remainder of the loins was raw.

The above and other experimental work has indicated that one of the important aspects of our invention is what may be termed "selective cooking" or "selective denaturing." That is, we desire to cook or thoroughly heat the myosepta by inserting the hypoderic needles as close to the planes of these membranes as possible. Insertion of the needles substantially at these planes and the directing of the steam only on the membranes is not always mechanically possible so that it is inevitable that some of the flesh adjacent these planes will be cooked to some extent. Moreover, it is not desirable to cook the intervertebral pods to any substantial extent or to denature the ligaments which attach the epi-central ribs to the spinal formation. Substantial cooking of the former can be avoided so that almost invariably the spinal formation is intact. However, the latter is more difficult and some of the epi-central ribs are loosened from the skeletal structure and are pulled away from the skeletal structure with the loins in the experiments thus far conducted. This can be minimized to some extent by decreasing the depth of insertion of the needles in the epi-central plane while the needles are inserted in the planes of the spines substantially to the spinal formation. In general the skeletal structure is substantially free of useful flesh indicating that the myoseptum or the flesh directly adjacent thereto has been adequately heated to accomplish denaturing.

The next step in the method of our invention is to skin the fish. As previously mentioned, in the present methods of cleaning fish, after precooking the skins of the fish are removed before the fish is broken into quarters or when the fish is "in the round" directly after completion of the precooking and subsequent cooling. With the method of our invention, the skin is attached to four long loins, each of which is of a nature such that the fish may be placed skin down substantially flat on a planar surface. This is of material advantage in facilitating the skinning of the fish and cannot be accomplished when the fish is "in the round."

In the preferred method of skinning of our invention the separated loins are placed skin down for approximately 15 seconds on a perforated plate through the perforations of which steam is discharged and impinges on the skin. Preferably the steam is superheated to about 200° C. and emerges through the perforations of the plate at approximately atmospheric pressure. When the exposure time is increased the flesh below the skin is cooked to a greater depth. With superheated steam at about 200° C. with a very short interval of cooking, the flesh underlying the skin is not cooked to any appreciable extent but the layer of material beneath the skin sometimes termed the tela subcutanea is preferably denatured. The skin remains moist for relatively easy removal. Additional experiments have shown that the skin may be denatured for relatively easy removal at steam temperatures as low as 100° C. but then the exposure time must be increased to approximately 30 seconds. However, the preferred temperature range is 150 to 250° C. and the preferred exposure time is from 10 to 15 seconds. While a matter of choice, the particular steam plate employed was about 26 gauge aluminum with one millimeter holes spaced upon two millimeter centers. Of course, the time exposure will depend upon the size of the fish but this time exposure will, where specifically included, be termed a short interval or more than a few seconds.

When the skin is cooked by steam it remains moist and we have found that it can be removed by holding the fish in contact with a rotating brush with relatively stiff bristles. To secure best results in skinning we have found that the loins should not be desiccated as drying of the fish tends to cause the skin to adhere to the underlying flesh. To avoid desiccation of the skin, if the fish are to be placed in cold storage for any considerable length of time they should preferably be glazed.

The next step in the fish cleaning process is to remove the dark meat. Some of this dark meat is easily removed as it has an integument or covering which serves as a parting so that it can be easily pulled away from the loins. Other portions of the dark meat must be scraped away with a knife. Adjacent the dark meat there is usually while or light meat that has been discolored by "running of color" from the dark meat into the light meat. This light but slightly discolored meat is preferably scraped or cut away also. It may be packed separately from the light meat and sold at a discount or it may be sold as scrap.

One of the distinct advantages of our invention is that access to this dark meat is had prior to precooking. The dark meat may be removed either prior to or after the skinning operation but in any event it should be done prior to precooking. Precooking in the conventional manner causes a substantial increase in the amount of running of color from the dark meat into the light meat. Therefore, cooking as is presently practised results in a large waste of light meat discolored in the precooking.

After the loins have been completely cleaned they are ready to be precooked. If the loins are from a large fish they may be split to convenient size for precooking. In any precooking batch it is desirable that the loins or cut up loins from large fish be of substantially uniform size. The purpose of this is to insure that with a given temperature and time each loin or cut up loin will cook the same amount to avoid underdone and overdone parts. This is difficult to accomplish when the fish are cooked by present practices because the fish vary in size to a very substantial extent.

One of the important facts in connection with our invention, as previously mentioned, lies in savings to be realized in cutting down wastage of fish resulting from present practices in precooking. The shrinkage loss may be as much as 30 percent of the total weight of the fish in accordance with the authority previously mentioned. While of course all of this loss cannot be prevented, one factor of importance in minimizing wastage lies in loading each batch with loins or pieces of loins of substantially the same size. The cooking time and temperature then may be more accurately controlled. Experimentally we have found that with our method it may be possible to reduce the pre-cooking time to from 15 minutes to ½ hour with steam at about 216° F. with a substantial reduction in shrinkage of flesh, loss of oils and liquids and nutritive elements. When our process is applied commercially it may be necessary to vary the time from these times found to be satisfactory experimentally due among other factors, to the condition of the fish being processed. Because the loins or cut up loins are smaller than the whole fish, the loins are more uniformly cooked. That is, there is less difference in degree of cooking between the exterior of the loin and the interior of the loin. When the fish are cooked "in the round" overcooking of the exterior portions of the fish and undercooking of the interior portions of the fish is almost impossible to avoid.

After the loins have been precooked they are allowed to cool sufficiently to enable them to be packed. Here again a distinct advantage results from the application of our invention because of two factors: the loins of fish being smaller than the whole fish, cool more rapidly; and since the loins need not be manually handled after cooling they need only be cooled sufficiently to enable them to pass through the can packing machine.

After the salt and vegetable oil have been added, the filled can is sealed and retorted in the usual manner.

While we have described the preferred method of our invention it will be apparent that departures may be made therein, for example, in the order in which the steps are performed; in the particular procedure adopted at any step of the method; and in the particular method employed to denature the proteins adjacent the cleavage planes without departing from the spirit of our invention as set forth in the appended claims.

We claim:

1. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of heating the fish only directly adjacent said walls longitudinally of the fish to denature the proteins only adjacent said walls and without to any substantial extent altering the character of the flesh of the remainder of the loins and then separating the loins from the skeletal structure along said walls.

2. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of denaturing the proteins of the fish by a heating medium, said heating medium being applied directly adjacent said walls longitudinally of the fish without to any substantial extent altering the character of the flesh of the remainder of the loins and then separating the loins from the skeletal structure and from each other along said walls substantially free of bones while leaving the skeletal structure essentially intact.

3. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of denaturing the proteins of the fish by applying heat for only a few seconds directly adjacent said walls longitudinally of the fish without to any substantial extent altering the character of the flesh of the remainder of the loins and then separating the loins along said walls from the skeletal structure and from each other so as to produce at least two separate and distinct loins.

4. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of penetrating the fish directly adjacent said walls essentially to the central spinal formation with a hot inert fluid, the hot inert fluid being applied substantially throughout the length of said walls and without to any substantial extent altering the character of the flesh of the remainder of the loins and then separating the loins from the skeletal structure along said walls substantially free of bones while leaving the skeletal structure essentially intact.

5. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of penetrating the fish directly adjacent said walls essentially to the central spinal formation with steam applied for only a few seconds, the steam being applied substantially throughout the length of said walls and without to any substantially extent altering the character of the flesh of the remainder of the loins and then separating the loins from the skeletal structure and from each other along said walls substantially free of bones while leaving the skeletal structure essentially intact and essentially free of flesh.

6. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of puncturing the fish longitudinally thereof to form a multiplicity of holes extending substantially to the spinal formation and substantially only along said walls, flowing a protein denaturing fluid in the form of steam into said holes for only a few seconds to denature the proteins substantially only adjacent said walls and without to any substantial extent altering the character of the flesh of the remainder of the loins and then separating the loins along said walls from the skeletal structure and from each other essentially free of bones while leaving the skeletal structure essentially intact.

7. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of puncturing the fish longitudinally thereof to form a multiplicity of holes extending substantially to the spinal formation and substantially only along said walls, flowing a protein denaturing fluid in the form of steam into said holes for only a few seconds to denature the proteins substantially only adjacent said walls and without to any substantial extent altering the character of the flesh of the remainder of the loins, separating the loins from the skeletal structure along said walls essentially free of bones while leaving the skeletal structure essentially intact and separately skinning the loins separated from the skeletal structure.

8. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of denaturing the proteins of the fish by steam to physically weaken the proteinaceous tissue, the steam being applied directly adjacent said walls longitudinally of the fish without to any substantial extent altering the character of the flesh of the remainder of the loins, separating the loins from the skeletal structure and then separately skinning the loins separated from the skeletal structure by super heated steam applied to the skin to denature the skin while maintaining it in a moist condition, the super heated steam being applied for only a short interval to denature the tela subcutanea without denaturing the flesh therebeneath to any substantial extent.

9. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of puncturing the fish longitudinally thereof to form a multiplicity of holes extending substantially to the spinal formation and substantially only along said walls, flowing a protein denaturing fluid in the form of steam into said holes for only a few seconds to denature the proteins substantially only adjacent said walls and without to any substantial extent altering the character of the flesh of the remainder of the loins, separating the loins from the skeletal structure and then separately skinning the loins separated from the skeletal structure by superheated steam applied to the skin to denature the skin while maintaining it in a moist condition, the superheated steam being applied for only a short interval to denature the tela subcutanea without denaturing the flesh therebeneath to any substantial extent.

10. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of denaturing the proteins of the fish by steam applied directly adjacent said walls longitudinally of the fish without to any substantial extent altering the character of the flesh of the remainder of the loins, separating the loins from the skeletal structure, separately skinning the loins separated from the skeletal structure, cooking the loins after the dark meat has been removed, cooling the loins, cutting the loins into packing size pieces and packing the pieces into containers.

11. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of puncturing the fish longitudinally thereof to form a multiplicity of holes extending substantially to the spinal formation and substantially only along said walls, flowing a protein denaturing fluid in the form of steam which physically weakens proteinaceous tissue into said holes to denature the proteins substantially only adjacent said walls and without to any substantial extent altering the character of the flesh of the remainder of the loins, removing the loins from the skeletal structure, separately skinning the loins separated from the skeletal structure, cooking the loins for from 15 to 30 minutes at a temperature of approximately 216° F. after the dark meat has been removed, cooling the loins, cutting the loins into packing size pieces, and packing the pieces into containers.

12. A method of preparing eviscerated fish for consumption, the fish having a skeletal structure which when considered in cross-section divides the fish into four loins which extend lengthwise of the fish substantially from the head to the tail which comprises removing said loins substantially intact and substantially in their natural state from the skeletal structure with the skeletal structure being substantially intact and the four loins being substantially free of bones and separately removing the skin from each of said four loins, said loin removal step being accomplished by applying steam at a cooking temperature only between said loins and the skeletal structure.

13. A method in accordance with claim 12 which includes the steps of precooking the separated loins for from approximately 15 to 30 minutes at a cooking temperature, cooling the loins, cutting the loins into packing size pieces, packing the pieces into containers and sealing the containers.

14. A method in accordance with claim 12 which includes the steps of removing most of the dark meat from the loins while they are in an essentially raw condition, precooking the separated loins for from approximately 15 to 30 minutes at a cooking temperature, cooking the loins, cutting the loins into packing size pieces, packing the pieces into containers and sealing the containers.

15. A method in accordance with claim 12 in which the skin removal step includes placing the loins on a planar surface skin down and subjecting the skin to a high temperature for a time duration sufficient to cook the skin but insufficient to denature the proteins of the loins beyond the layer of the loins which lies close to the skin.

16. A method of preparing eviscerated fish for consumption, the fish having a skeletal structure which when considered in cross-section divides the fish into four loins which extend lengthwise of the fish substantially from the head to the tail which comprises removing said loins substantially raw and substantially intact from the skeletal structure with the skeletal structure being substantially intact and the four loins being substantially free of bones and separately removing the skin from each of said four loins, said skin removal step includes placing the loins on a planar surface skin down and subjecting the skin to a high temperature for a time duration sufficient to cook the skin but insufficient to denature the proteins of the loins beyond the layer of the loins which lies close to the skin.

17. In a method of preparing fish for consumption, the fish having a skeletal structure which includes bones extending outwardly with respect to a central spinal formation in rows and membranes extending between said bones in the rows thereof, said rows of bones and membranes defining natural walls extending lengthwise of the fish and defining loins separated by said walls, the steps of applying steam to the proteins of the fish directly adjacent said walls longitudinally of the fish without to any substantial extent altering the character of the flesh of the remainder of the loins and then separating the loins from the skeletal stucture along said walls.

References Cited in the file of this patent

UNITED STATES PATENTS

| | | |
|---|---|---|
| 2,230,942 | Gibbs | Feb. 4, 1941 |
| 2,493,586 | Lang | Jan. 3, 1950 |
| 2,635,050 | Stevenson et al. | Apr. 14, 1953 |